United States Patent Office 2,915,958
Patented Dec. 8, 1959

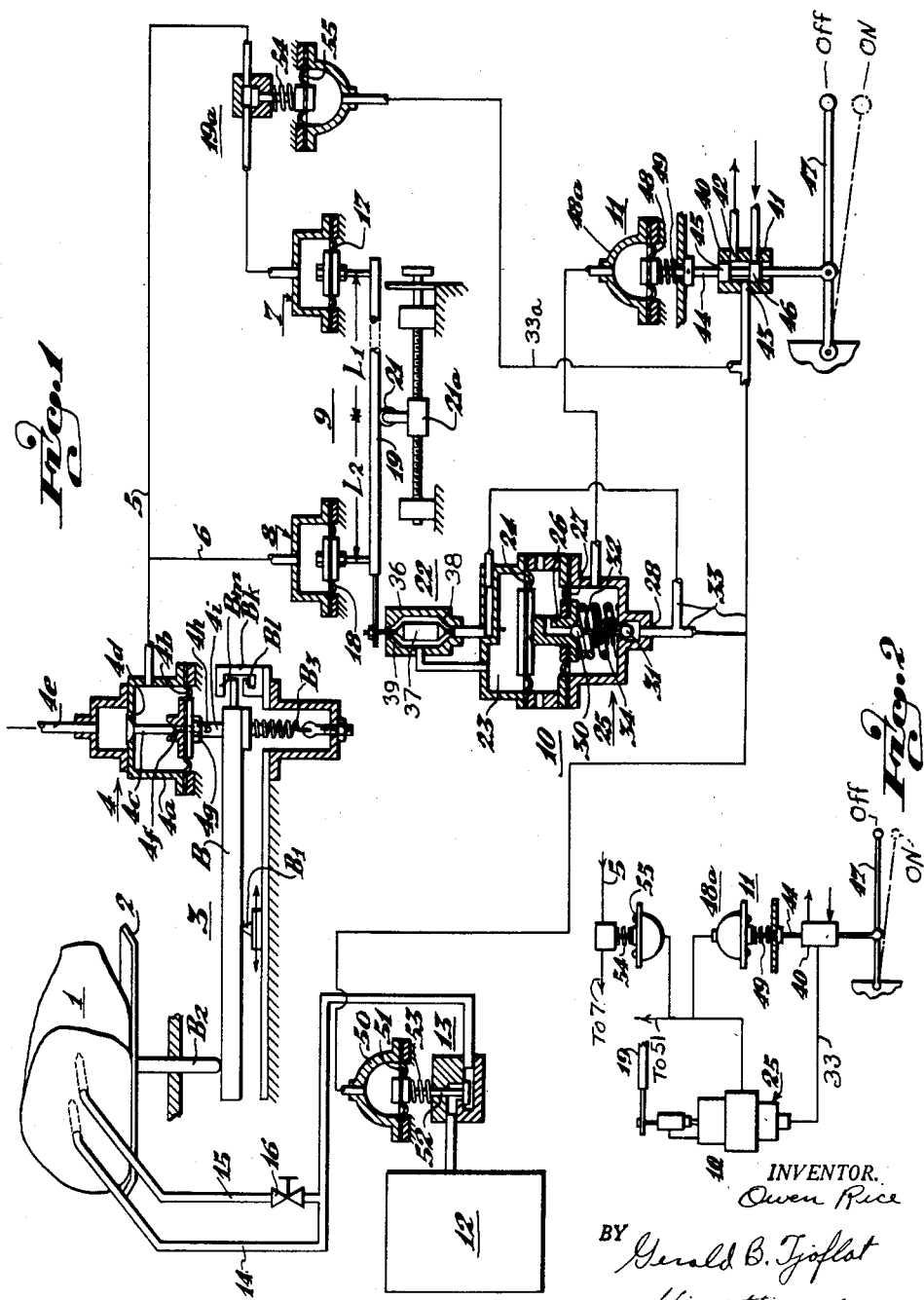

2,915,958

HAM PUMPING APPARATUS

Owen Rice, Upper St. Clair Township, Allegheny County, Pa., assignor to Hagan Chemicals & Controls Inc., Pittsburgh, Pa., a corporation of Pennsylvania Application December 5, 1958, Serial No. 778,442

4 Claims. (Cl. 99—257)

This invention relates to apparatus for injecting pickle solution into meat products such as hams and the like.

In the curing of meat products, such as hams, bacon slabs and other products, pickle solution may be introduced into them under pressure as by pumping. The amount pumped is a percentage of the green weight of the product. Thus, if a ham, for example, weighs ten pounds in the green state and 10% of pickle is to be added, one pound of pickle is introduced into the ham.

An object of this invention is to provide a system for automatically establishing a selected final or reference weight based on the green weight and then automatically shutting off the pickle solution when the desired percentage of pickle has been pumped into the ham.

A further object is to provide a system that automatically weighs the green product, develops a signal that is proportional to that weight, establishes a final reference or pumped weight and then automatically shuts off the pickle solution when the green weight plus the weight of the added pickle is equal to the reference weight.

The foregoing and other objects of the invention will be apparent to those of ordinary skill in the art to which the invention pertains from the following description taken in conjunction with the accompanying drawings.

In the drawings:

Figure 1 is a more or less diagrammatic illustration of apparatus embodying a form of the invention, for pumping pickle solution into meat products and automatically shutting off the solution when a predetermined weight of the pickle has been pumped into the same; and Fig. 2 illustrates a modification of a portion of the apparatus.

In the drawing, a product 1 to be injected with pickle solution is shown. That product may, for example, be a ham.

The ham is placed on the pan 2 of a weighing apparatus 3 having an automatic balancing device 4 that generates a signal whose magnitude is directly proportional to the weight of the product including the weight of the pickle. The signal is delivered by conductors 5 and 6 to signal receiving devices 7 and 8, respectively, of a balance 9. The signal delivered to the receiving device 7 is automatically maintained constant at the green weight value, while the signal to device 8 increases as the weight of pickle pumped into the ham increases. The balance lever arms $L_1$ and $L_2$ for devices 7 and 8 are so arranged that the reference signal will develop a turning moment that is proportional to the final pickled weight.

Balance 9 operates a relay 10 that actuates a control device 11 by which the pumping of pickle solution to the ham and the establishment of the constant reference signal in device 7 of the balance, are effected automatically and simultaneously.

As soon as the turning moment of pickled weight signal as delivered to device 8 reaches the reference value, the pumping of pickle solution is automatically stopped, the apparatus is reset to zero, and is in readiness to receive another green ham for pumping. The pickle solution is supplied by a pumping unit 12 through a normally closed valve 13 to the ham via one or more flexible tubes 14 and 15 provided with suitable needles by which the solution may be introduced into the arteries and veins of the ham. One of these tubes may be provided with a shut off valve 16 whereby either one or both of the tubes may be utilized.

The preferred form of system is one in which air pressure may be utilized to operate the various components thereof.

In a pneumatic system, the unit 4 of the weighing device develops a pneumatic balancing force and a signal whose magnitude varies with the instantaneous weight of the ham.

Devices 7 and 8 comprise diaphragm chambers, the diaphragms 17 and 18 of which exert forces on the balance beam 19 that are proportional to the areas of the diaphragms and the pressure acting thereon.

The reference weight is established by trapping the green weight signal pressure in the chamber 7 by means of a normally open diaphragm operated valve 19a that closes the moment the pumping of pickle solution commences. Beam 19 is mounted on a fulcrum 21 carried by a traveling nut 21a mounted on a screw 21b whereby the fulcrum may be so placed that lever arm $L_1$ is made greater than lever arm $L_2$. The selected ratio of lever arm $L_1$ to lever arm $L_2$ is such that device 9 is out of balance until the final pickled weight has been reached. Thus, if the moment of the reference force developed by diaphragm 17 is $(RF \times L_1)$ and the moment of the force developed by diaphragm 18 of device 8 in response to the pickled weight signal is $(PF \times L_2)$, the balance 9 will be in balance when the moment of the pickled weight equals the moment of the reference weight.

Balance 9 actuates a valve 22 that controls the operation of the relay 10.

The weighing device 3 comprises a beam B, mounted on a fulcrum $B_1$. The pan 2 is supported by a stem $B_2$ on one end of the beam. The opposite end of the beam is provided with an adjustable tare weight spring $B_3$ by which the dead weight of the pan 2 and stem $B_2$ are neutralized.

The balancing and signal generating device 4 comprises a housing 4a which is closed at the bottom by a diaphragm 4b. Device 4 includes a valve for establishing the balancing pressure on the diaphragm 4b and generating a signal that is proportional to the net weight of product on pan 2. The valve includes a stem 4c, one end of which controls an inlet port 4d to which air pressure of constant value is supplied by a pipe 4e, the other end of the stem controlling an exhaust port 4f in an exhaust port assembly 4g carried by the central portion of the diaphragm 4b. The exhaust port leads to the atmosphere through a passage 4h formed in a stem 4i. The stem 4i bears on the beam B.

When product is placed on the pan 2, beam B rocks counterclockwise thereby opening the supply or inlet port 4d and admitting pressure to the diaphragm 4b. That pressure increases in value until the force developed by it and exerted on the beam B balances the turning moment of the product weight about the fulcrum $B_1$. When that balance occurs, the inlet port 4d is closed. As the product weight increases because of the addition of pickle, the balancing pressure increases.

The pressure acting on diaphragm 4b is transmitted by the pipes 5 and 6 to the receiving devices 7 and 8 of the balance 9.

When the product is removed from the pan 2, the diaphragm 4b moves the exhaust valve seat away from the stem 4c thereby exhausting the pressure to the atmosphere.

In order to limit motion of beam B to its operating range, a double stop B$k$ is provided, having upper and lower lugs B$l$ and B$m$. The lugs are so placed as to engage either the upper or the lower face of the beam and thereby limit its motion in either direction about the fulcrum to its operating range.

Relay 10 comprises a diaphragm chamber 23 having a diaphragm 24 therein for actuating a pilot valve 25. The pilot valve has an exhaust valve assembly 26 carried by a sealing diaphragm 27 and a pressure supply port 28. The exhaust and supply ports are controlled by ball valves 30 and 31 carried by a stem 32. The operating pressure for the valves 22 and the pilot valve 24 is furnished by a supply pipe 33, from the initiating device 11 when the latter is in "on" position.

The diaphragms 24 and 27 are urged in a direction to cause ball 31 to seat on the inlet port seat of the pilot valve by means such as a spring 34.

As shown, the effective area diaphragm 24 is greater than that of the sealing diaphragm 27; thus, pressure is delivered to the diaphragm 24, the moment device 11 is initiated manually to "on" position, because pilot valve 25 has been opened wide by diaphragm 24. When the initiating device 11 is in "on" position, operating pressure is delivered by pipe 33$a$ to the operator of the trapping valve 19$a$, whereby it is closed and the green weight signal is trapped in device 7. Simultaneously, operating pressure is delivered to the operator of pickle valve 13 causing it to open whereby pickle solution is delivered to the ham.

When the amount of pickle required by the reference signal in the diaphragm chamber of device 7 has been matched by the pickled weight signal in device 8, valve 22 is operated to close its inlet port and open the exhaust port, thereby to exhaust pressure from the main operating diaphragm 24 of relay 10. The pilot valve 25 is thereby closed and pressure is exhausted from the diaphragm chamber of initiating device 11, causing it to return to its initial position. In that position, operating pressure to the pickle valve 13 and trapping valve 19$a$ is exhausted to the atmosphere causing the former to close and the latter to open and exhaust pressure from the diaphragm chamber of device 7. Thus, the system resets to zero and is ready for the pumping of another ham.

As shown in the drawing, valve 22 comprises a body 36 having therein a valve 37 which is suspended from the beam of the balance 9. The operating pressure for the valve enters at the bottom through an inlet port seat 38 and passes outwardly of the body to the chamber of diaphragm 24. The upper end of the body is provided with an exhaust port seat 39. The relative throttling of the inlet and the exhaust ports 38 and 39 by the valve 37 determines the pressure delivered to the diaphragm 24.

When a ham is placed on the pan 2, device 4 delivers the same pressure to devices 7 and 8. But because the lever arm $L_1$ is longer than lever arm $L_2$, the beam is rotated clockwise whereby valve 22 is opened wide causing full pressure to be applied to the diaphragm 24. Full pressure on diaphragm 24 causes the pilot valve 25 to open wide; therefore, when the initiating device 11 is moved manually to "on" position, full pressure is supplied by pipe 33 to the diaphragm chamber of device 11 whereby it is held in "on" position until the pickled weight of the product balances the trapped green weight on balance 9.

The initiating device 11 comprises a valve body 40 having a supply port 41, an exhaust port 42, an outlet port 43 that supplies pipe 33, and a valve stem 44 having lands 45 and 46 thereon whereby the valve may be shut off or actuated to a position in which the exhaust port 42 is closed and communication is established between the supply port 41 and the outlet port 43. The valve stem may be provided with a handle 47 for manually positioning valve stem 44 in the "on" position. The valve stem is held in the "on" position by pressure delivered by valve 25 to the diaphragm 48. When that pressure is released, spring 49 resets device 11 and its valve to "off" position.

The pickle valve 13 as schematically illustrated, comprises a chamber 50 having a diaphragm 51 that operates the valve stem 52 to open position, the valve being urged to closed or seated position by a spring 53. The reference weight valve 19$a$ is similarly constructed except that it is biased to normally open position by a spring 54 and closes when pressure is applied to the diaphragm 55.

In the arrangement shown in Fig. 2, the outlet of the valve of initiating device 11 is delivered to the inlet port of valve 25. The outlet port of valve 25 supplies the diaphragms 48, 51 and 55, initiating device 11, pickle valve 13 and the trapping valve as shown. But, as in the case of Fig. 1, the pickle pumping, green weight and signal trapping operations and the holding of initiating device 11 in "on" position, cannot take place until product is on pan 2 and the handle 47 has been moved to "on" position.

The percentage of pickle supplied to the ham or product in either of the two systems may be regulated by adjusting the fulcrum of the balance 9 to either increase or decrease the ratio of $L_1/L_2$.

Having thus described the invention, it will be apparent to those of ordinary skill in the art to which the invention pertains, that various modifications and changes may be made in the illustrated embodiment without departing from either the spirit or the scope of the invention.

Therefore, what is claimed as new and desired to be secured by Letters Patent is:

1. A system for pickle pumping meat products, such as hams and the like, comprising a device for weighing the product and having means for generating a balancing weight signal directly proportional in magnitude to the weight of the product, a ratio relay comprising a beam mounted on a fulcrum that is adjustable along the same to provide lever arms $L_1$ and $L_2$, force developing devices disposed to engage the beam at distances from the fulcrum equal to said lever arms $L_1$ and $L_2$, respectively, signal lines connecting said weight signal to said force developing devices, means for supplying pickle solution to said product and simultaneously maintaining the signal in one of said force responsive devices constant at the prepumped weight of said meat product, and means controlled by said ratio relay for shutting off the pickle solution supply when the pickle weight has reached a predetermined value with respect to the prepumped weight.

2. A system as in claim 1 in which the weighing device comprises a fulcrumed weight beam having a chamber and a diaphragm arranged to exert a force on the beam at one side of the fulcrum, and a force transmitter on the other side for applying the weight of the product to the beam, valve means actuated by said beam for establishing a pneumatic pressure in said chamber of such magnitude that the force of the pressure on the diaphragm balances the product weight on the beam, and that the force producing devices on the ratio relay comprise diaphragm chambers each of which are connected to the pressure developed by said valve means, one of the diaphragms of one of said diaphragm chambers acting at such a distance from the fulcrum that the turning moment thereof is proportional to the final pumped weight, means for trapping the green weight signal in said one diaphragm chamber so that only the pumped weight acts in the other diaphragm chamber, the pickle solution control means shutting off the pickle solution when the turning moment of the pickled weight signal balances the first mentioned turning moment.

3. A system for automatically controlling the amount of pickle solution pumped into hams and the like, comprising a weighing device having means for generating a balancing pressure whose magnitude is proportional to the weight of the ham from green weight to pumped weight, a pneumatic balance having a fulcrum and a pneumatic device responsive to the green weight pressure only and a pneumatic device responsive to the pumped weight, the fulcrum being so positioned between the pneumatic devices of the balance that the moment of the force produced by the green weight is proportional to the desired pumped weight, means for pumping pickle solution to the ham and means controlled by said pneumatic balance for shutting off the pumping of solution to the ham when the pumped weight of the ham balances the pneumatic balance.

4. A system for automatically controlling the pumping of pickle solution into hams and the like, comprising a weighing device having a pneumatic balance for generating a balancing pressure directly proportional to the weight of the ham on the weighing device, a balance having a fulcrum and pressure diaphragm devices on each side thereof at unequal lever arms $L_1$ and $L_2$, means conducting the balancing pressure to each of said pressure diaphragm devices, means for trapping the green weight pressure signal in the device having the greater lever arm, means for supplying pickle solution to the ham, and means controlled by said balance for initiating operation of the pickle supply means and actuating the signal trapping means, said balance control means shutting off the supply of pickle solution to the ham when the pickled weight and the trapped green weight signal are in balance.

References Cited in the file of this patent

UNITED STATES PATENTS

| | | |
|---|---|---|
| 2,088,257 | Beisser | July 27, 1937 |
| 2,346,953 | Walter | Apr. 18, 1944 |
| 2,605,695 | Campbell | Aug. 5, 1952 |
| 2,755,731 | Hensgen et al. | July 24, 1956 |